(12) United States Patent
Mathias et al.

(10) Patent No.: US 12,249,836 B2
(45) Date of Patent: Mar. 11, 2025

(54) METHOD FOR MANAGING A BATTERY (71) Applicant: TOTALENERGIES RENEWABLES, Courbevoie (FR)

(72) Inventors: Laurent Mathias, La Tour de Salvagny (FR); Clément Guyon, Paris (FR)

(73) Assignee: TOTALENERGIES RENEWABLES, Courbevoie (FR)

( * ) Notice: Subject to any disclaimer, the term of this patent is extended or adjusted under 35 U.S.C. 154(b) by 24 days.

(21) Appl. No.: 18/255,752

(22) PCT Filed: Dec. 3, 2021

(86) PCT No.: PCT/EP2021/084129
§ 371 (c)(1),
(2) Date: Jun. 2, 2023

(87) PCT Pub. No.: WO2022/117796
PCT Pub. Date: Jun. 9, 2022

(65) Prior Publication Data
US 2023/0420946 A1     Dec. 28, 2023

(30) Foreign Application Priority Data

Dec. 4, 2020   (EP) ..................................... 20315484

(51) Int. Cl.
*H02J 3/32*    (2006.01)
*H02J 3/24*    (2006.01)
*H02J 7/00*    (2006.01)

(52) U.S. Cl.
CPC ............... *H02J 3/32* (2013.01); *H02J 3/241* (2020.01); *H02J 7/00302* (2020.01);
(Continued)

(58) Field of Classification Search
CPC ........ H02J 3/32; H02J 7/0048; H02J 7/00302; H02J 7/00306; Y04S 10/14
See application file for complete search history.

(56) References Cited

U.S. PATENT DOCUMENTS

| 7,839,027 B2 | 11/2010 | Shelton et al. | |
| 2015/0214754 A1* | 7/2015 | Choi | H02J 7/0069 320/134 |

(Continued)

FOREIGN PATENT DOCUMENTS

| CN | 104795831 A * | 7/2015 | ................ H02J 3/28 |
| EP | 3197011 A1 | 7/2017 | |
| WO | 2009156261 A2 | 12/2009 | |

OTHER PUBLICATIONS

Shim, Jae Woong, et al. "On droop control of energy-constrained battery energy storage systems for grid frequency regulation." IEEE Access 7 (2019): 166353-166364. (Year: 2019).*

(Continued)

*Primary Examiner* — Ryan Johnson
(74) *Attorney, Agent, or Firm* — Leason Ellis LLP (57) ABSTRACT

The present invention refers to a method for managing a battery (7) coupled to a power grid (1) having a nominal frequency wherein at least one parameter for compensating frequency deviations around the nominal frequency occurring in the power grid (1) is adapted, at predetermined time intervals, according to a state of charge (SoC) of the battery (7) and the amplitude of the frequency deviations during a predetermined duration.

9 Claims, 4 Drawing Sheets

(52) U.S. Cl.
CPC ........ *H02J 7/00306* (2020.01); *H02J 7/0048* (2020.01); *H02J 7/00712* (2020.01); *Y04S 10/14* (2013.01)

(56) References Cited

U.S. PATENT DOCUMENTS

| | | | |
|---|---|---|---|
| 2016/0079755 A1* | 3/2016 | Triebel | H02J 3/32 307/52 |
| 2016/0276859 A1* | 9/2016 | Kudo | H02J 3/38 |
| 2016/0352114 A1 | 12/2016 | Kaji et al. | |

OTHER PUBLICATIONS

Written Opinion and International Search Report for corresponding international application No. PCT/EP2021/084129, dated Mar. 15, 2022.

* cited by examiner

METHOD FOR MANAGING A BATTERY

CROSS-REFERENCE TO RELATED PATENT APPLICATIONS

This application is a U.S. National Stage Application under 35 U.S.C. § 371 of International Patent Application No. PCT/EP2021/084129 filed Dec. 3, 2021, which claims the benefit of priority of European Patent Application No. 20315484.4 filed Dec. 4, 2020, both of which are incorporated by reference in their entireties. The International Application was published on Jun. 9, 2022, as International Publication No. WO/2022/117796 A1.

The present invention refers to the field of batteries and in particular to batteries coupled to a power grid comprising a plurality of electrical energy sources.

With the development of renewable energy sources such as solar modules or wind turbines, the number of energy sources coupled to the power grid increases which tends to make the power grid more and more unstable. Such instability leads to variations of the frequency of the electric signal transmitted through the power grid. Indeed, the power grid has a nominal frequency, for example 50 Hz, but with a high number of different energy sources, the amplitude of the variations of the electric signal around the nominal frequency becomes larger.

Such variations of the electric signal may be absorbed by the batteries coupled to the power grid, in order to stabilize the electrical grid. However, such absorption of the frequency variations may lead to damages on the batteries. These variations of the frequency of the electric signal transmitted through the power grid have therefore to be taken into account in the management of the different equipments coupled to the power grid and in particular in the management of the batteries coupled to the power grid.

It is therefore an object of the present invention to provide a solution to manage a battery in order to take into account the instability of the power grid to prevent damages of the battery due to this instability.

SUMMARY OF THE INVENTION

The present invention refers to a method for managing a battery coupled to a power grid having a nominal frequency wherein at least one parameter for compensating frequency deviations around the nominal frequency occurring in the power grid is adapted, at predetermined time intervals, according to a state of charge of the battery and the amplitude of the frequency deviations during a predetermined duration.

Such management enables providing a stabilization of the power grid while avoiding damaging the battery.

According to another embodiment, a plurality of functioning modes corresponding to a plurality of predefined ranges of charge of the battery are defined and wherein a predetermined value or range of values of the at least one parameter for compensating frequency deviations around the nominal frequency occurring in the power grid is defined for each functioning mode.

According to a further embodiment, within a given functioning mode, the at least one parameter for compensating frequency deviations around the nominal frequency occurring in the power grid may vary within a first predetermined range or may be set to a first value during a charge of the battery and may vary within a second predetermined range or may be set to a second value during a discharge of the battery.

According to another embodiment, the at least one parameter for compensating frequency deviations around the nominal frequency occurring in the power grid is:
  a setpoint of a power associated with the management of the state of charge of the battery and/or,
  a gain setting associated with a power engaged for grid stabilization.

According to a further embodiment, the sum of the power engaged for grid stabilization and the power associated with the management of the state of charge of the battery is equal to the total power of the battery.

According to another embodiment, the different functioning modes are:
  a normal state mode,
  a high and a low limit state modes,
  a high and a low alert state modes which are used in case of an abnormal event occurring in the power grid,
  a high and a low reserve modes wherein the adaptation of the at least one parameter for compensating frequency deviations around the nominal frequency occurring in the power grid is stopped until the state of charge returns to the normal state mode,
  a high and a low security modes which have to be avoided.

According to a further embodiment, in the normal state mode,
  the gain setting associated with an engaged power varies between an upmost value, for example 25, and a lowermost value, for example 5, when the state of charge is lower than 50% and is set to the lowermost value when the state of charge is higher than 50% during a charge of the battery and varies between the upmost value and the lowermost value when the state of charge is higher than 50% and is set to the lowermost value when the state of charge is lower than 50% during a discharge of the battery,
  the setpoint of a power associated with the management of the state of charge of the battery varies between 2 extreme values, for example between 0.25 and −0.25.

According to another embodiment, in the high limit state mode,
  the gain setting associated with an engaged power is set to the lowermost value during a charge of the battery and is set to the upmost value during a discharge of the battery,
  the setpoint of a power associated with the management of the state of charge of the battery is set to the low extreme value, for example −0.25,
  and in the low limit state mode,
  the gain setting associated with an engaged power is set to the upmost value during a charge of the battery and is set to the lowermost value during a discharge of the battery,
  the setpoint of a power associated with the management of the state of charge of the battery is set to the high extreme value, for example 0.25.

According to a further embodiment, in the high alert state mode,
  the gain setting associated with an engaged power is set to the lowermost value during a charge of the battery and is set to the upmost value during a discharge of the battery,
  the setpoint of a power associated with the management of the state of charge of the battery is set to the low extreme value, for example −0.25,
  and in the low alert state mode, the gain setting associated with an engaged power is set to the upmost value during a charge of the battery and is set to the lowermost value during a discharge of the battery, the setpoint of a power associated with the management of the state of charge of the battery is set to the high extreme value, for example 0.25.

According to another embodiment, in the high and low reserve mode, the gain setting associated with an engaged power and the setpoint of a power associated with the management of the state of charge of the battery are set to 0.

According to a further embodiment, the predetermined time intervals correspond to intervals of at least 15 minutes, for example 30 minutes.

BRIEF DESCRIPTION OF THE DRAWINGS

Further features and advantages of the invention will become more clearly apparent from reading the following description, which is provided by way of an illustrative and non-limiting example, and with reference to the accompanying drawings, in which.

In these figures, identical elements use the same reference signs.

DETAILED DESCRIPTION OF THE INVENTION

The following achievements are examples. Although, the specification refers to one or several embodiments, it does not imply that each reference refers to the same embodiment or that the features apply only to a single embodiment. Simple features of different embodiments can also be combined to provide other embodiments.

The present invention refers to a method for managing a battery coupled to a power grid.

Figure 1:
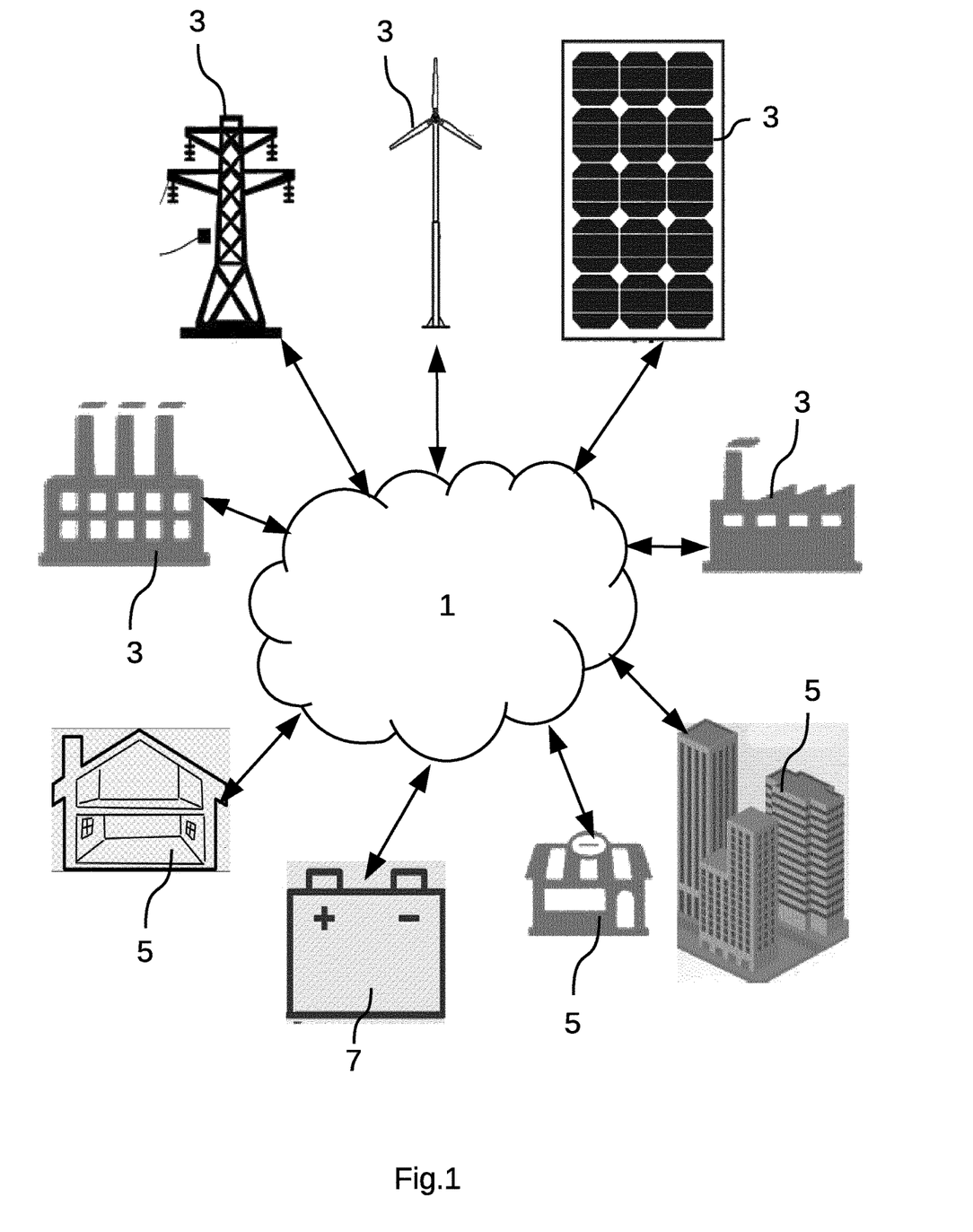
FIG. 1 is a diagram representing a power grid and different sources and charges linked to the power grid.

FIG. 1 represents a diagram of a power grid 1 and a plurality of sources 3 such as power plants, solar panels, wind turbines . . . coupled to this power grid 1 as well as a plurality of charges 5 such as houses, buildings or warehouses also coupled to the power grid. Batteries 7 are also coupled to the power grid and may act either as sources or as charges. The power grid 1 has a nominal frequency fn, for example 50 Hz but the actual frequency of the power grid 1 may vary around this nominal frequency fn. These variations are due to the differences that may occur between the power provided by the sources 3 and the power required by the charges 5.

If the amplitude of these variations is higher than a predefined threshold or if they last longer than a predefined duration, these variations may lead to damages on the different equipments coupled to the power grid 1.

Thus, different states of the power grid 1 have been defined:

A normal state wherein the absolute value of the gap with the nominal frequency is less than 200 mHz and the absolute value of the gap with the nominal frequency is not higher than 50 mHz for more than 15 minutes or not higher than 100 mHz for more than 5 minutes.

An alert state wherein the absolute value of the gap with the nominal frequency is less than 200 mHz and the absolute value of the gap with the nominal frequency is higher than 50 mHz for more than 15 minutes or higher than 100 mHz for more than 5 minutes. The normal state returns when the absolute value of the gap with the nominal frequency is less than 50 mHz.

An emergency state wherein the absolute value of the gap with the nominal frequency is more than or equal to 200 mHz. The normal state returns when the absolute value of the gap with the nominal frequency is less than 50 mHz.

In order to prevent damages on the batteries 7, the present invention refers to the adaptation of at least one parameter for compensating frequency deviations around the nominal frequency fn occurring in the power grid 1. This adaptation is achieved at predetermined time intervals, for example 15 minutes which is high enough to avoid introducing additional instabilities to the power grid 1 and to enable power grid management to oversee the behavior of the batteries 7 in the next few minutes. Other predetermined intervals, preferably higher than 15 minutes, for example 30 zo minutes may also be used. The management of the battery 7 is achieved in order to enable the battery 7 to provide or to absorb a power corresponding to a deviation of 200 mHz during 15 minutes.

The adaptation is achieved according to a state of charge SoC of the battery 7 and the amplitude of the frequency deviations during a predetermined duration.

Figure 2:
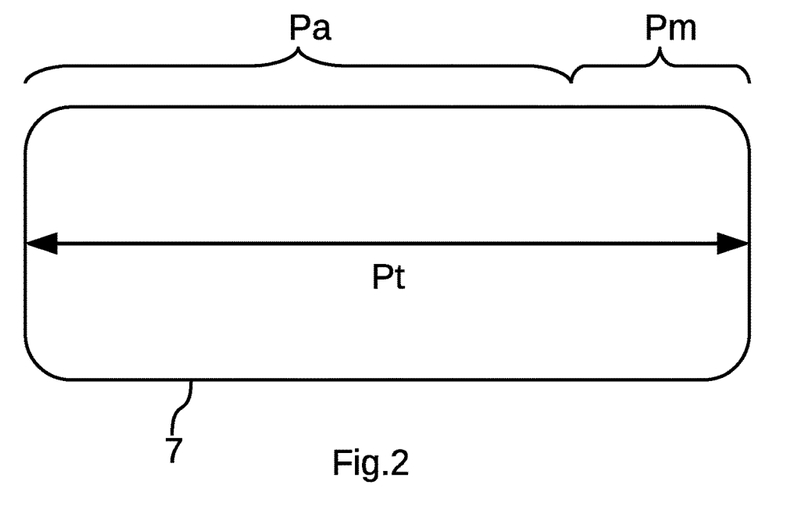
FIG. 2 is a diagram representing the distribution of the power within a battery.

FIG. 2 is a diagram of the distribution of the power in a battery 7. The total power Pt of the battery 7 is divided into an active part Pa corresponding to the power engaged for power grid stabilization and a management part Pm reserved for the management of the state of charge SoC of the battery 7. The distribution may correspond to approximately 80% of the total power Pt associated with the active part Pa and 20% with the management part Pm. For a battery having a total power of 25 MW, 20 MW may be associated with the active part and 5 MW may be associated with the management part. This ratio does not vary over time.

The power Pa engaged for power grid stabilization may be defined by the following equation:

$Pa = K*(f-fn)$ with fn the nominal frequency, f the actual frequency and K the gain setting associated with the power Pa engaged for power grid stabilization.

Thus, the response by a battery 7 to a variation of the frequency of the power grid may be adapted by modifying the gain K or by modifying a setpoint Sp of the power Pm associated with the management of the state of charge SoC of the battery 7. As indicated previously, the values of this gain K and this setpoint Sp are chosen according to the state of charge SoC of the battery 7 and the deviations of the power grid 1 frequency with respect to the nominal frequency fn. It has to be noted that the gain K and the setpoint Sp cannot be changed when the power grid 1 is in an alert state.

Figure 3:
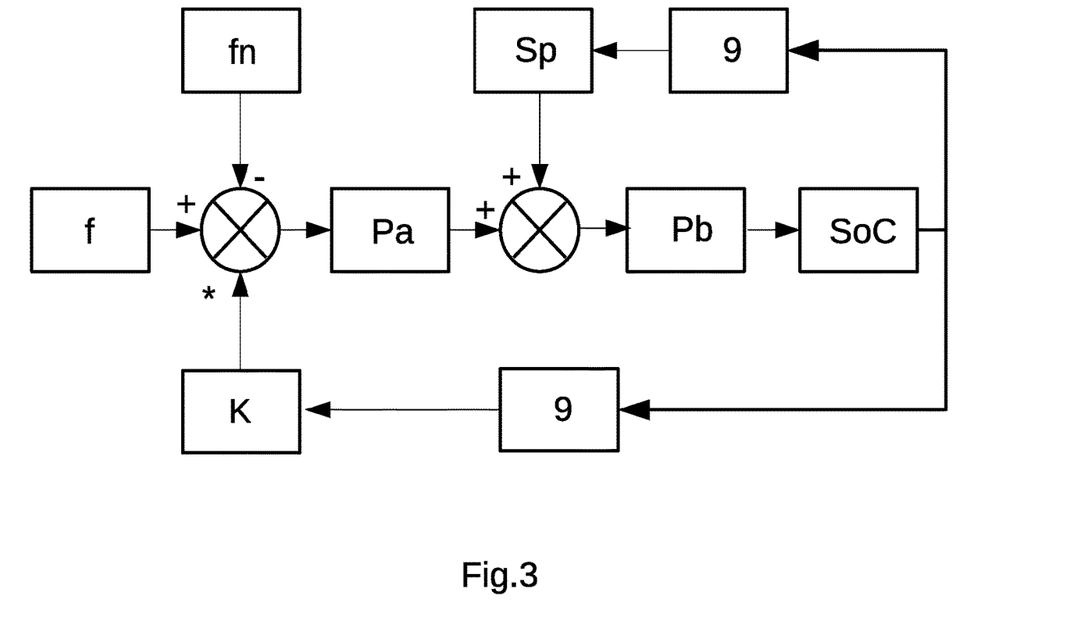
FIG. 3 is a flowchart of the battery management strategy.

The management of these parameters may be represented by the flowchart of FIG. 3. The measured frequency f of the power grid 1 is compared to the nominal frequency fn and the gain K is applied to the difference f-fn to produce the power Pa engaged for power grid stabilization. The setpoint Sp is then added to the power Pa engaged for power grid stabilization to provide a battery power Pb which gives the state of charge SoC of the battery 7. The state of charge SoC of the battery 7 is then transmitted to a management unit 9 which can provide a feedback loop toward the setpoint Sp and/or the gain setting K in order to adapt the values of the setpoint Sp and the gain setting K according to the state of charge SoC of the battery 7. The adaptation of the values of the setpoint Sp and/or of the gain setting K is made at predetermined time intervals corresponding to intervals of at least 15 minutes, for example 30 minutes in order to prevent the introduction of an additional level of instability in the power grid 1.

Figure 4:
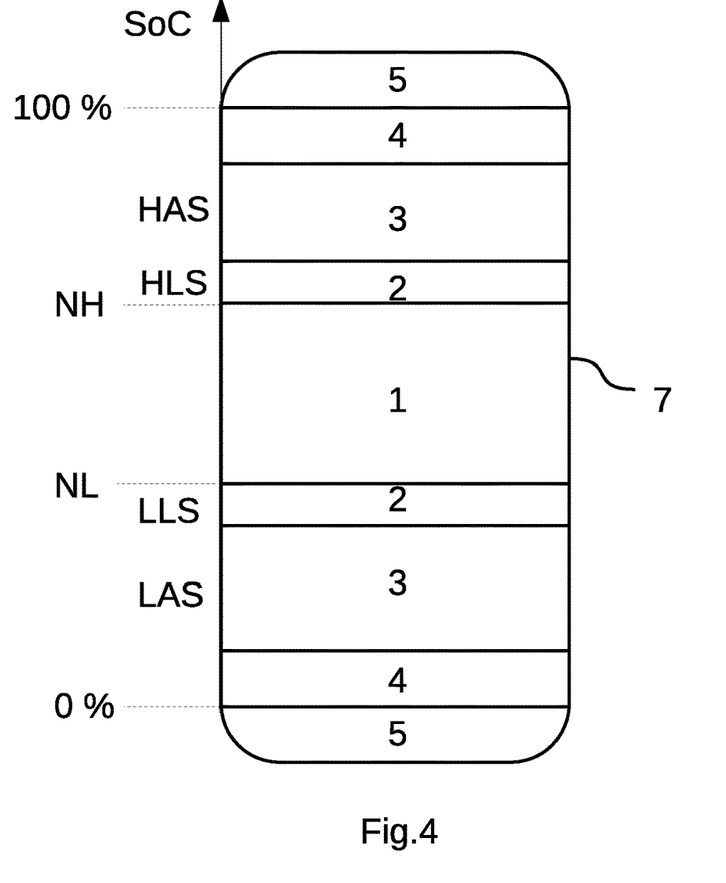
FIG. 4 is a diagram of the different modes associated with the state of charge of the battery.

Different functioning modes associated with different states of charge SoC are defined as represented in FIG. 4. The different modes, except the first mode 1, comprise a high level band corresponding to a high state of charge SoC of the battery 7 and a low level band corresponding to a low state of charge SoC of the battery 7.

The different modes comprise a first mode 1 corresponding to a normal state mode, a second mode 2 corresponding to a limit state mode, a third mode 3 corresponding to an alert state mode, a fourth mode 4 corresponding to a reserve mode and a fifth mode 5 corresponding to a security mode.

The alert state mode 3 is used in case of an abnormal event occurring in the power grid 1 such as a power plant breakdown. In the reserve mode, the adaptation of the setpoint Sp and/or the gain setting K are stopped until the state of charge SoC returns to the normal state mode. The security mode has to be avoided to avoid damages of the battery 7. The goal of the management of the battery 7 is to adapt the values of the setpoint Sp and the gain setting K to keep the battery in the normal state mode as much as possible.

Different strategies may be set up to ensure the management of the battery 7. One example will be given in the following of the description but other strategies may also be applied to adapt the values of the setpoint Sp and/or the gain setting K according to the variations of the frequency f and the state of charge SoC of the battery 7.

a) Normal State Mode 10

In the normal mode 10, the gain setting K varies between an upmost value, herein 25, and a lowermost value, herein 5.

Figure 5:
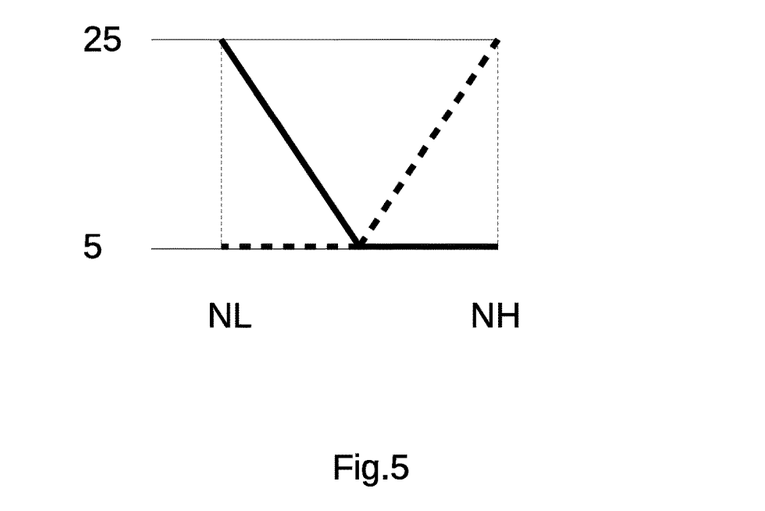
FIG. 5 is a diagram of the evolution of the gain with respect to the state of charge of the battery in the normal state mode.

During a charge of the battery 7 represented in solid line in FIG. 5, the gain setting K is set to the upmost value 25 when the state of charge SoC is low, close to the lower limit NL of the normal state mode 10, and is set to the lowermost value 5 when the state of charge is high, close to the upper limit NH of the normal state mode 10.

During a discharge of the battery 7 represented in dashed line in FIG. 5, the gain setting K is set to the lowermost value 5 when the state of charge is low, close to the lower limit NL of the normal state mode 10, and is set to the uppermost value 25 when the state of charge is high, close to the upper limit of the normal state mode 10.

A higher value of the gain setting K produces a higher response of the battery 7 to a variation of the frequency f with respect to the nominal frequency fn.

Figure 6:
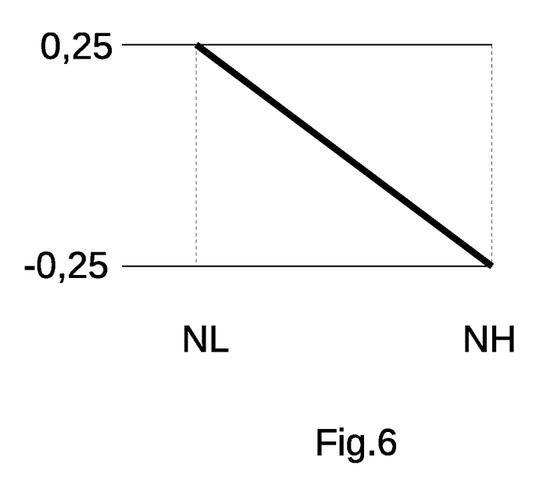
FIG. 6 is a diagram of the evolution of the setpoint with respect to the state of charge of the battery in the normal state mode.

The setpoint Sp varies between 2 extreme values, for example between an high extreme value 0.25 and a low extreme value −0.25 as represented in FIG. 6. The 0.25 and −0.25 are normalized values which refer to a setpoint Sp associated with a unitary power Pa engaged for power grid stabilization (for a power Pa of 20MW as described previously, the setpoint associated with the normalized value of 0.25 will be 5 MW (20 MW*0.25)).

A high positive value of the setpoint Sp promotes the charge of the battery 7 and a low negative value of the setpoint Sp promotes a discharge of the battery 7.

Indeed, the setpoint Sp acts as an offset for the total power Pt of the battery 7 so that if the setpoint is set of 5 MW, 5 MW will be injected in the power grid 1 independently of the power Pa engaged for power grid stabilization. Thus, if at a given instant, the power Pa engaged for power grid stabilization is 2 Mw, the total power Pt of the battery 7 will be 5 MW−2 MW=3 MW. As a consequence, at this given instant, the battery 7 will be charging despite the fact that the power grid 1 requires a discharge of the battery 7.

b) Limit State Mode 11

In the high limit state mode noted HLS in FIG. 4, the gain setting K is set to the lowermost value 5 during a charge of the battery 7 and is set to the upmost value 25 during a discharge of the battery 7.

In this high limit state mode HLS, the setpoint SP is set to the low extreme value, for example −0.25.

In the low limit state mode noted LLS in FIG. 4, the gain setting K is set to the upmost value 25 during a charge of the battery 7 and is set to the lowermost value 5 during a discharge of the battery 7.

In this low limit state mode LLS, the setpoint Sp is set to the high extreme value, for example 0.25.

c) Alert State Mode 12

In the high alert state mode noted HAS in FIG. 4, the gain setting K is set to the lowermost value 5 during a charge of the battery 7 and is set to the upmost value 25 during a discharge of the battery 7.

In this high alert state mode HAS, the setpoint Sp is set to the low extreme value −0.25.

In the low alert state mode noted LAS in FIG. 4, the gain setting K is set to the upmost value 25 during a charge of the battery 7 and is set to the lowermost value 5 during a discharge of the battery 7.

In this low alert state mode LAS, the setpoint Sp is set to the high extreme value 0.25.

d) Reserve Mode 13

In the reserve mode, the frequency sensitive mode described above is suspended. In both the high and low reserve modes 13, the gain setting K and the setpoint Sp are set to 0 until the power grid 1 returns to its normal state.

When the power grid 1 returns to its normal state, if the state of charge SoC of the battery 7 is low, the battery 7 sets a constant setpoint Sp of charge during two hours to return to a state of charge SoC of 50% and if the state of charge SoC is high, the battery 7 sets a constant setpoint Sp of discharge during two hours to return to a state of charge SoC of 50%.

e) Security Mode 14

The strategy prevents from entering the security mode 14.

As indicated previously, other management may be set up, for example, only the setpoint Sp may vary according to the state of charge SoC of the battery 7 and the variations of the frequency while the gain setting K remains constant or alternatively, only the gain setting K may vary according to the state of charge SoC of the battery 7 and the variations of the frequency while the setpoint Sp remains constant.

Indeed, the variations of the gain K and the setpoint Sp between the lower limit and the upper limit are not necessarily as represented in FIG. 5 and FIG. 6 and in particular not necessarily linear.

According to a first alternative, the gain K may be set to the lowermost value 5 (independently of the state of charge SoC) and the setpoint Sp may vary linearly until the state of charge SoC reaches a threshold corresponding to a predetermined percentage before reaching the alert state mode, for example 5% before reaching the alert state mode and may be set to the high extreme value above this threshold.

According to a second alternative, the gain K is set to the lowermost value 5 when the state of charge SoC lies within a range from 45% to 55%, varies linearly from 5 to 7.5 otherwise and is set to the uppermost value when the alert state mode is reached.

According to a third alternative, the gain K is set to the lowermost value 5 and the setpoint Sp varies as a sinusoidal function $(\sin(X*(\pi/2)))$ with X the difference with the percentage of charge from a 50% charge) and is set to the uppermost value when the alert state mode is reached.

Other laws can be applied for the gain K and the setpoint Sp in order to compensate for the frequency variations.

These managements are set up at predetermined time intervals of at least 15 minutes. A high number of batteries 7 may be managed with such strategy in order to enable stabilization of the power grid 1.

Thus, such management of the battery 7 based on the adaption of the gain setting K associated with a power engaged for grid stabilization and/or of the setpoint Sp of a power associated with the management of the state of charge SoC of the battery 7 enables absorbing frequency variations of the power grid 1 around the nominal frequency fn and therefore provide a stabilization of the power grid 1. Such management may also enable facing a breakdown of a source 3 of the network such as a power plant breakdown.

The invention claimed is:

1. Method for managing a battery coupled to a power grid having a nominal frequency wherein at least one parameter for compensating frequency deviations around the nominal frequency occurring in the power grid is adapted, at predetermined time intervals, according to a state of charge (SoC) of the battery and the amplitude of the frequency deviations during a predetermined duration, wherein a plurality of functioning modes corresponding to a plurality of predefined ranges of charge of the battery are defined, wherein a predetermined value or range of values of the at least one parameter for compensating frequency deviations around the nominal frequency occurring in the power grid is defined for each functioning mode, and wherein the different functioning modes are:
a normal state mode,
a high and a low limit state modes,
a high and a low alert state modes which are used in case of an abnormal event occurring in the power grid,
a high and a low reserve modes wherein the adaptation of the at least one parameter for compensating frequency deviations around the nominal frequency (fn) occurring in the power grid is stopped until the state of charge (SoC) returns to the normal state mode, and
a high and a low security modes which have to be avoided.

2. Method in accordance with claim 1 wherein, within a given functioning mode, the at least one parameter for compensating frequency deviations around the nominal frequency occurring in the power grid may vary within a first predetermined range or may be set to a first value during a charge of the battery and may vary within a second predetermined range or may be set to a second value during a discharge of the battery.

3. Method in accordance with claim 1 wherein the at least one parameter for compensating frequency deviations around the nominal frequency occurring in the power grid is:
setpoint (Sp) of a power associated with the management of the state of charge (SoC) of the battery and/or,
a gain setting (K) associated with a power engaged for power grid stabilization.

4. Method in accordance with claim 3 wherein the sum of the power (Pa) engaged for grid stabilization and the power (Pm) associated with the management of the state of charge (SoC) of the battery is equal to the total power (Pt) of the battery.

5. Method in accordance with claim 3 wherein, in the normal state mode,
the gain setting (K) associated with an engaged power (Pa) varies between an upmost value, and a lowermost value, when the state of charge is lower than 50% and is set to the lowermost value when the state of charge is higher than 50% during a charge of the battery and varies between the upmost value and the lowermost value when the state of charge is higher than 50% and is set to the lowermost value when the state of charge (SoC) is lower than 50% during a discharge of the battery, and
the setpoint (Sp) of a power associated with the management of the state of charge (SoC) of the battery varies between 2 extreme values.

6. Method in accordance with claim 3 wherein, in the high limit state mode,
the gain setting (K) associated with an engaged power (Pa) is set to the lowermost value during a charge of the battery and is set to the upmost value during a discharge of the battery, and
the setpoint (Sp) of a power (Pm) associated with the management of the state of charge (SoC) of the battery is set to the low extreme value, and in the low limit state mode,
the gain setting (K) associated with an engaged power (Pa) is set to the upmost value during a charge of the battery and is set to the lowermost value during a discharge of the battery, and
the setpoint (Sp) of a power (Pm) associated with the management of the state of charge of the battery is set to the high extreme value.

7. Method in accordance with claim 3 wherein, in the high alert state mode,
the gain setting (K) associated with an engaged power (Pa) is set to the lowermost value during a charge of the battery and is set to the upmost value during a discharge of the battery, and
the setpoint (Sp) of a power (Pm) associated with the management of the state of charge of the battery is set to the low extreme value, and in the low alert state mode,
the gain setting (K) associated with an engaged power (Pa) is set to the upmost value during a charge of the battery and is set to the lowermost value during a discharge of the battery, and
the setpoint (Sp) of a power (Pm) associated with the management of the state of charge of the battery is set to the high extreme value.

8. Method in accordance with claim 3 wherein, in the high and low reserve mode, the gain setting (K) associated with an engaged power (Pa) and the setpoint (Sp) of a power (Pm) associated with the management of the state of charge (SoC) of the battery are set to 0.

9. Method in accordance with claim 1 wherein the predetermined time intervals correspond to intervals of at least 15 minutes.

* * * * *